March 16, 1926.
M. F. ELLIOTT
LIQUID GAUGE
Filed August 27, 1924
1,577,209
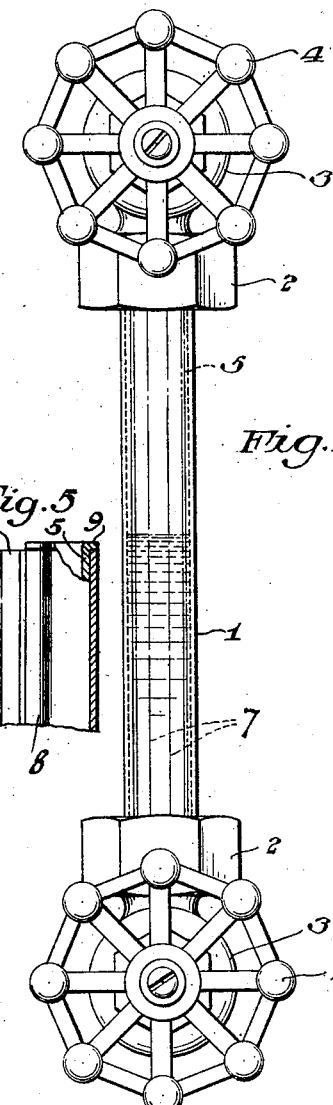
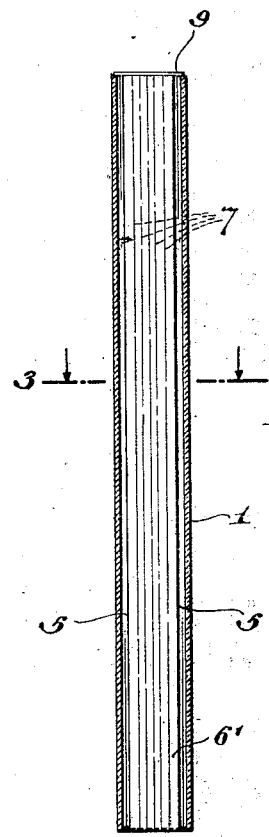
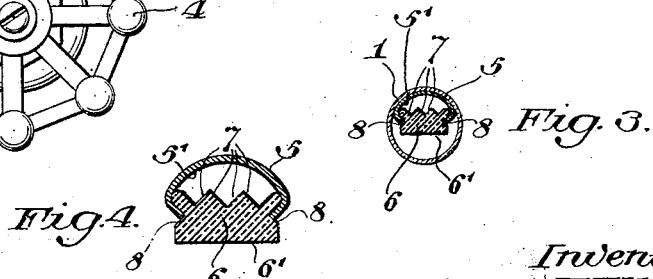
Inventor:
Millard F. Elliott,
By Blount & Helket
Attorneys.

Patented Mar. 16, 1926.

1,577,209

UNITED STATES PATENT OFFICE.

MILLARD F. ELLIOTT, OF PALMYRA, NEW JERSEY.

LIQUID GAUGE.

Application filed August 27, 1924. Serial No. 734,381.

*To all whom it may concern:*

Be it known that I, MILLARD F. ELLIOTT, a citizen of the United States, and a resident of Palmyra, county of Burlington, and State of New Jersey, have invented certain new and useful Improvements in Liquid Gauges, of which the following is a specification, reference being had to the accompanying drawing.

My invention relates to means for determining the height of liquid columns within enclosed spaces and more particularly the height of liquid columns in gauge glasses such as are customarily attached to steam boilers, tanks and the like.

A principal object of my invention is to provide means for enhancing the visibility of the liquid column in a gauge glass or substantially similar device so as to render the column much more distinctly visible than would be the case in the absence of such means.

A further object of the invention is to provide means in the nature of a self contained unit which may be easily inserted in or removed from an ordinary gauge glass and which when positioned therein is effective to enhance the visibility of the liquid column.

A still further object of the invention is to provide means adapted for association with an ordinary gauge glass and which, when in such association, are effective to enhance the difference in appearance, and create a greater contrast between, the liquid and air columns in the glass than would otherwise be the case, said means being of such nature as to permit their manufacture as separate units adapted for insertion in gauge glasses of ordinary construction and which, when utilized in conjunction therewith, will in no wise interfere with the ordinary operation of the glass, will be entirely contained therein so as to be protected from injury or liability of breakage and which may be manufactured and sold at a relatively low cost.

My invention further includes all of the other objects and novel features of construction and arrangement to which reference may hereinafter be made or which may be apparent from the accompanying drawing forming a part hereof.

In the said drawing I have illustrated one embodiment of my invention, Fig. 1 being a front elevation of a gauge glass containing one of my said units. Fig. 2 is an axial longitudinal section of a gauge glass tube with one of the units positioned therein, the tube being removed from the fittings by which it is operatively attached to the boiler or the like; Fig. 3 is a transverse section on line 3—3 in Fig. 2; Fig. 4 is an enlarged transverse section through the unit removed from the tube, and Fig. 5 is a detail side elevation illustrating the arrangement of the supporting flange of the holder. The same numerals are used to designate similar parts in the several figures.

Referring now more particularly to the drawing, the gauge glass tube 1 therein shown is of ordinary construction and is supported at its ends in couplings or unions 2, 2 forming parts of fittings 3, 3 adapted for attachment to a boiler or the like, hand wheels 4, 4 being arranged to operate suitable valves in each fitting to enable the flow of liquid into the tube to be controlled as desired. As the several parts hitherto mentioned are of well known form and construction detailed description thereof would be superfluous.

In attaining the objects of my invention I insert into the tube 1 of the gauge glass a unit of the construction now to be described and which is best shown in Figs. 2 to 4 inclusive. This unit comprises an elongated holder 5 preferably of sheet metal which is bent or formed so as to exhibit a substantially semi-circular cross section whereby the holder presents a substantially troughed shape along its longitudinal direction and a concave surface on its inner face. Conveniently the material of which the holder is made may be of black or other dark color or in case the holder be formed of copper, brass or the like which is of a naturally light color, the holder may be artificially blackened or darkened in any suitable way either over its entire surface or merely on its inner concave surface 5'.

Maintained in fixed relation with the holder and spanning its open side is a strip or bar 6 of glass or other suitable transparent material which is plane on its front face 6', that is, upon its face which is furthest removed from the surface 5' and is provided with one or more longitudinally extending ribs or prisms 7 on its opposite or rear face, that is, the face adjacent the concave surface 5' of the holder. While the holder and the bar may be united in any convenient way I prefer to provide the sides of the bar with longitudinally extending notches or grooves 8 and to bend the edges of the strip thereinto as best shown in Fig. 4 so as to firmly grip the strip and secure the parts firmly together.

In order to prevent the unit from slipping vertically downward in the gauge glass tube when inserted therein, I may turn one end, which in practice will form the upper end, of the holder slightly outwardly so as to form a narrow horizontally extending flange 9 adapted to rest on the upper end of the gauge glass tube and thus support the unit vertically therein, but, if desired, other means for accomplishing this function may be utilized. It will be understood that the curvature of the holder will ordinarily be determined in conformity with that of the gauge glass tube in which the unit is intended for insertion and that the holder and glass strip will be so proportioned that the unit may be readily slid into the tube to assume a position therein in which the outer surface of the holder will rest against or adjacent the inner surface of the tube and the front face 6' of the strip be disposed slightly in advance of an axial plane symmetrically disposed with respect to the holder as best shown in Fig. 3.

In practice, in order to adapt the units to any particular length of gauge glass and to facilitate their assembly therewith, the units may be made in a series of standard lengths of sufficient extent to cover all the lengths of gauge glasses ordinarily encountered but of course in special cases a unit of excessive length may be suitably cut off to any length desired in order to satisfy a non-standard requirement. It will thus be understood that in commercial practice the gauge glasses may be supplied complete with the units therein assembled and in association with the ordinary fittings for attaching the glass to a boiler or the like or that the units may be sold separately for insertion in gauge glasses of ordinary construction so as to thereby form an operative combination therewith.

The operation of the invention may be described as follows: The unit being assembled in a gauge glass with the front or plane face 6' turned outward or toward the position of an observer looking at the glass from the position in which the same is customarily read and the valves being opened to permit the liquid column to seek its level in the glass, a strongly contrasting effect will be observed between the body of the liquid column and the space thereabove, the column, in the case of a transparent liquid such as water, appearing black or nearly black and the space above the column being illuminated and presenting a white or nearly white aspect. This contrast between the air and liquid columns is most pronounced and extends over a wide angle of visibility approximating 90° on either side of an axial plane perpendicular to the plane face 6' of the glass bar, thus enabling the height of the liquid column to be easily read from almost any position in front of the gauge glass.

I am aware that it has been proposed to employ reflectors, colored stripes and the like in association with gauge glasses for the purpose of magnifying, illuminating or otherwise increasing the visibility of the liquid column but so far as I am aware all of the said devices and expedients have been open to practical objections, and furthermore that, irrespective of such objections, the results attained by their use are not commensurate with those which I am able to produce in accordance with my invention.

It will furthermore be noted that a unit such as I have herein described may be inserted in any standard gauge glass now in use without in any way modifying or altering its construction with and that when so inserted the unit is entirely self contained within the tube of the glass and thereby protected from injury.

While I have herein described with some particularity a preferred embodiment of my invention, I do not thereby desire or intend to limit myself to any precise details of construction or arrangement of parts as the same are capable of modification in various particulars should such modification be deemed advantageous or desirable without departing from the spirit and scope of the invention as defined in the appended claims.

Having thus described my invention, I claim and desire to protect by Letters Patent of the United States:

1. An article of manufacture adapted for insertion in a gauge glass tube and comprising an elongated holder curved in cross section and provided with a supporting flange for resting upon the upper end of the tube and supporting the said article in position in the tube, and a strip of transparent material mounted in the holder, that face of the strip adjacent the holder being provided with a plurality of prisms extending longitudinally of the strip.

2. An article of manufacture adapted for insertion in a gauge glass tube and comprising an elongated holder curved in cross section to conform to the configuration of and fitting against the interior of the tube, said holder having its upper end bent outwardly forming a horizontal supporting flange for resting upon the upper end of the tube and a strip of transparent material disposed across the open side of the holder, that face of the strip adjacent the holder being provided with a plurality of prisms extending longitudinally of the strip, each side of the strip being provided with a groove and the longitudinal edges of the holder being disposed therein whereby the strip is maintained in fixed relation with the holder.

In witness whereof, I have hereunto set my hand this 26th day of August, 1924.

MILLARD F. ELLIOTT.